United States Patent
Skorka et al.

(10) Patent No.: US 11,985,431 B2
(45) Date of Patent: May 14, 2024

(54) IMAGING SYSTEM WITH AN ELECTRONIC SHUTTER

(71) Applicant: SEMICONDUCTOR COMPONENTS INDUSTRIES, LLC, Phoenix, AZ (US)

(72) Inventors: Orit Skorka, Santa Clara, CA (US); Radu Ispasoiu, Saratoga, CA (US); Brian Anthony Vaartstra, Nampa, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/643,714

(22) Filed: Dec. 10, 2021

(65) Prior Publication Data
US 2022/0232156 A1    Jul. 21, 2022

Related U.S. Application Data

(60) Provisional application No. 63/138,918, filed on Jan. 19, 2021.

(51) Int. Cl.
| H04N 5/235 | (2006.01) |
| G02F 1/1335 | (2006.01) |
| H04N 23/73 | (2023.01) |
| H04N 23/741 | (2023.01) |

(52) U.S. Cl.
CPC ..... *H04N 23/741* (2023.01); *G02F 1/133528* (2013.01); *H04N 23/73* (2023.01)

(58) Field of Classification Search
CPC ............ G02F 1/133528; H04N 5/2355; H04N 5/2353
See application file for complete search history.

(56) References Cited

U.S. PATENT DOCUMENTS

| 6,195,139 B1 | 2/2001 | Yamazaki et al. |
| 8,836,807 B2 * | 9/2014 | Qin .................... H04N 5/35581 348/222.1 |
| 9,505,981 B2 | 11/2016 | Chiou |

(Continued)

FOREIGN PATENT DOCUMENTS

| KR | 101434916 B1 * | 8/2014 |
| KR | 101434916 B1 * | 8/2014 |

(Continued)

*Primary Examiner* — Michael J Hess
*Assistant Examiner* — Naod W Belai
(74) *Attorney, Agent, or Firm* — Treyz Law Group, P.C.; Joseph F. Guihan

(57) ABSTRACT

An imaging system may include an electronic shutter. The electronic shutter may be positioned between an image sensor and a lens module or may be integrated as a package cover for the image sensor. The electronic shutter may selectively attenuate incident light that passes to the image sensor. To increase the dynamic range of the imaging system, the electronic shutter may have a first transparency while a first image is captured by the image sensor and a second, different transparency while a second image is captured by the image sensor. The first and second images are subsequently combined to form a single high dynamic range image. The electronic shutter may be controlled at a global level, at a sub-array level, or at a pixel level.

20 Claims, 9 Drawing Sheets

(56) References Cited

U.S. PATENT DOCUMENTS

| | | | |
|---|---|---|---|
| 9,930,263 B2* | 3/2018 | Terasawa | G03B 11/00 |
| 10,924,689 B1* | 2/2021 | Duckett, III | G02B 5/3058 |
| 11,036,067 B2 | 6/2021 | Skorka et al. | |
| 11,199,735 B2* | 12/2021 | Zhou | G02F 1/13306 |
| 2003/0098918 A1 | 5/2003 | Miller | |
| 2009/0109309 A1* | 4/2009 | He | H04N 5/2353 |
| | | | 348/E5.091 |
| 2012/0307128 A1 | 12/2012 | Vorovitchik | |
| 2016/0127661 A1 | 5/2016 | Hegyi et al. | |
| 2016/0232875 A1 | 8/2016 | Drolet et al. | |
| 2017/0276996 A1 | 9/2017 | Barbour et al. | |
| 2018/0007760 A1 | 1/2018 | Ollila | |
| 2020/0052019 A1* | 2/2020 | Yeh | H01L 27/14643 |
| 2020/0310013 A1* | 10/2020 | Gruver | G06V 10/60 |
| 2021/0185215 A1* | 6/2021 | Yuan | H04N 5/2258 |

FOREIGN PATENT DOCUMENTS

| | | | | |
|---|---|---|---|---|
| KR | 2018084686 A * | 7/2018 | | G03B 7/08 |
| WO | 2008147403 A1 | 12/2008 | | |
| WO | 2013044149 A1 | 3/2013 | | |

* cited by examiner

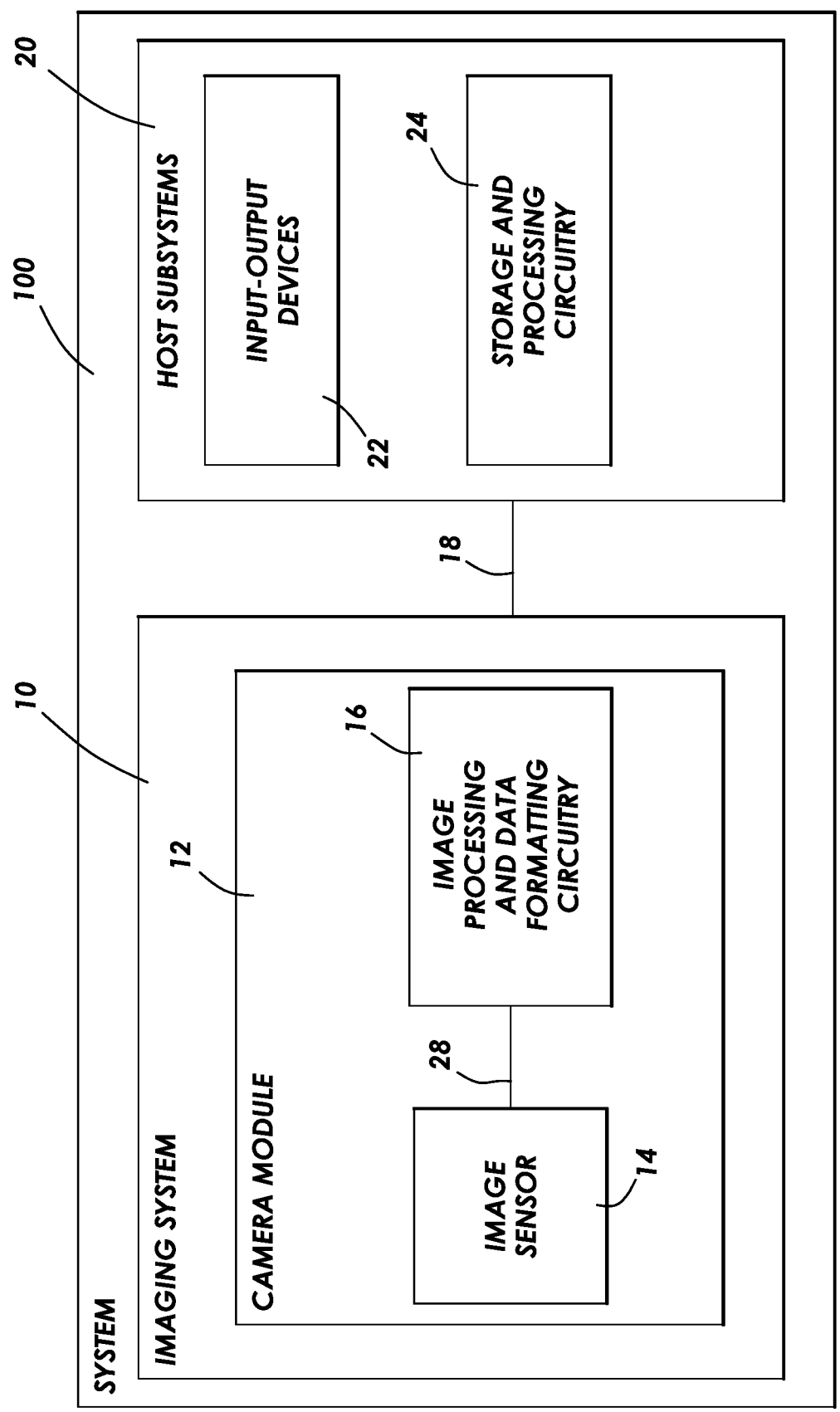

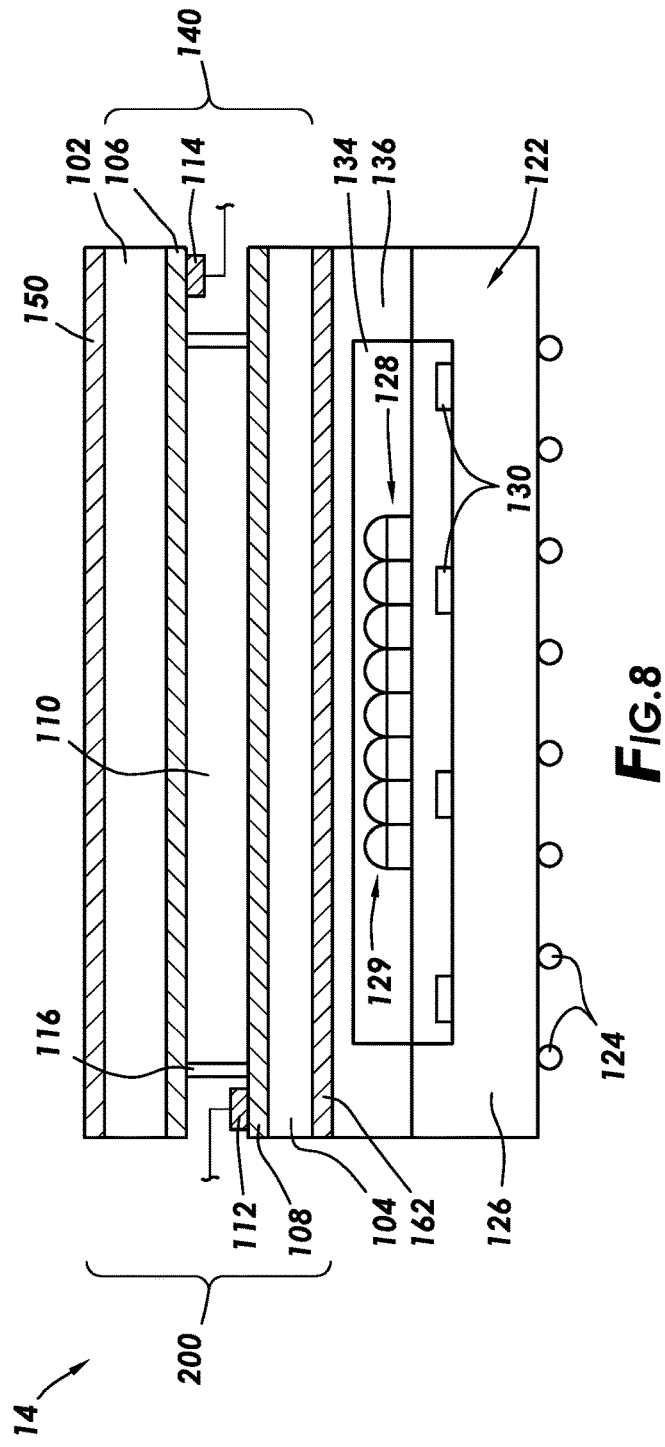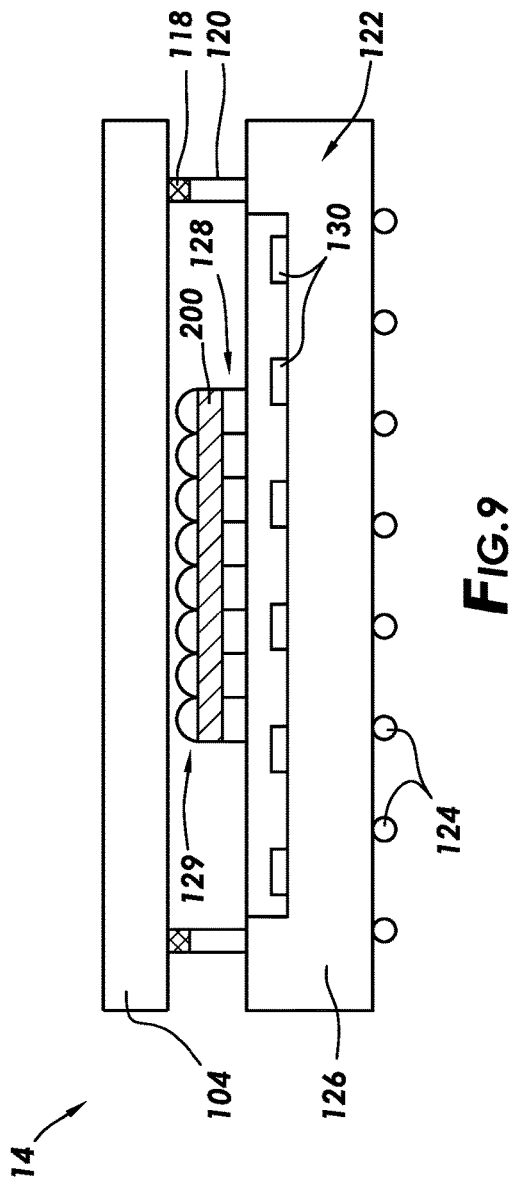

IMAGING SYSTEM WITH AN ELECTRONIC SHUTTER

This application claims the benefit of provisional patent application No. 63/138,918, filed Jan. 19, 2021, which is hereby incorporated by reference herein in its entirety.

BACKGROUND

This relates generally to imaging systems, and more particularly, to imaging devices having image sensor pixels with high dynamic range functionalities.

Image sensors are commonly used in electronic devices such as cellular telephones, cameras, and computers to capture images. Typical image sensors contain image pixels that include a photodiode for generating charge in response to incident light. Image sensors can operate using a global shutter or a rolling shutter scheme. In a global shutter scheme, every image pixel in the image sensor simultaneously captures an image, whereas in a rolling shutter each row of image pixels sequentially captures an image.

An image sensor has an associated dynamic range, which is expressed as a ratio of the largest and smallest possible luminance values for the image sensor in a single image. Image sensors sometimes have a lower dynamic range than is desired.

BRIEF DESCRIPTION OF THE DRAWINGS

FIG. 1A is a diagram of an illustrative electronic device having an image sensor in accordance with an embodiment.

FIG. 8 is a cross-sectional side view of an illustrative image sensor package with an electronic shutter that forms a package cover, that is controlled globally, and that is separated from an image sensor die by transparent adhesive in accordance with an embodiment.

FIG. 9 is a cross-sectional side view of an illustrative image sensor package with an electronic shutter interposed between pixel microlenses and a color filter array in accordance with an embodiment.

DETAILED DESCRIPTION

Figure 1B:
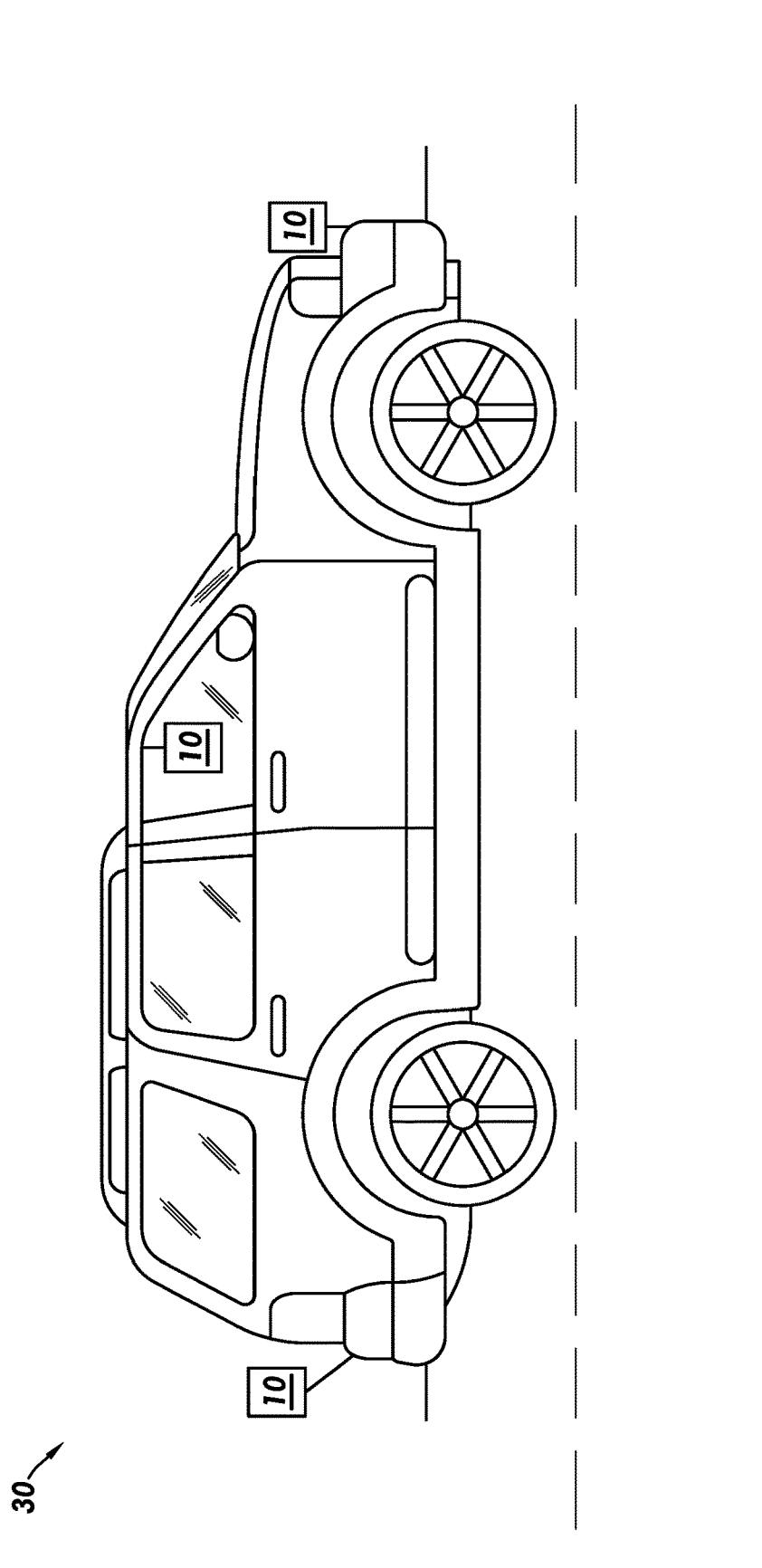
FIG. 1B is a diagram of an illustrative vehicle having an imaging system in accordance with an embodiment.

The present technology relates to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

FIG. 1A is a diagram of an illustrative imaging and response system including an imaging system that uses an image sensor to capture images. System 100 of FIG. 1A may be an electronic device such as a camera, a cellular telephone, a video camera, or other electronic device that captures digital image data, may be a vehicle safety system (e.g., an active braking system or other vehicle safety system), or may be a surveillance system.

In a vehicle safety system, images captured by the image sensor may be used by the vehicle safety system to determine environmental conditions surrounding the vehicle. The vehicle safety system may include an external image sensor that captures images of the vehicle's surroundings or an in-cabin image sensor that captures images of the interior of the vehicle (e.g., of the driver). As examples, vehicle safety systems may include systems such as a parking assistance system, an automatic or semi-automatic cruise control system, an auto-braking system, a collision avoidance system, a lane keeping system (sometimes referred to as a lane drift avoidance system), a pedestrian detection system, etc. In at least some instances, an image sensor may form part of a semi-autonomous or autonomous self-driving vehicle. System 100 may also be used for medical imaging, surveillance, and general machine vision applications.

As shown in FIG. 1A, system 100 may include an imaging system such as imaging system 10 and host subsystems such as host subsystem 20. Imaging system 10 may include camera module 12. Camera module 12 may include one or more image sensor packages 14 (sometimes referred to as image sensors 14) and one or more lenses.

Each image sensor in camera module 12 may be identical or there may be different types of image sensors in a given image sensor array integrated circuit. During image capture operations, each lens may focus light onto an associated image sensor package 14. Image sensor package 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 (sometimes referred to as control circuitry) via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, image sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as buttons, keypads, touch-sensitive areas, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

An illustrative example of a vehicle 30 such as an automobile is shown in FIG. 1B. As shown in the illustrative example of FIG. 1B, automobile 30 may include one or more imaging systems 10. The imaging systems may form part of a vehicular safety system 100 as discussed above. Imaging systems 10 may be imaging systems with dedicated image capture and/or image processing functions. If desired, an imaging system 10 may perform some or all of the image processing functions associated with a given driver assist operation. A dedicated driver assist processor (e.g., processing circuitry 24 in FIG. 1A) may receive signals from imaging systems 10.

In another suitable example, an imaging system 10 may perform only some or none of the image processing operations associated with a given driver assist function. For example, an imaging system 10 may merely capture images of the environment surrounding the vehicle 30 and transmit the image data to processing circuitry 24 for further processing. Such an arrangement may be used for vehicle safety system functions that require large amounts of processing power and memory (e.g., full-frame buffering and processing of captured images).

In the illustrative example of FIG. 1B, a first imaging system 10 is shown mounted on the front of car 30 (e.g., to capture images of the surroundings in front of the car), and a second imaging system 10 is shown mounted in the interior of car 30 (e.g., to capture images of the driver of the vehicle). If desired, an imaging system 10 may be mounted at the rear end of vehicle 30 (i.e., the end of the vehicle opposite the location at which first imaging system 10 is mounted in FIG. 1B). The imaging system at the rear end of the vehicle may capture images of the surroundings behind the vehicle. These examples are merely illustrative. One or more imaging systems 10 may be mounted on or within a vehicle 30 at any desired location(s).

Figure 2:
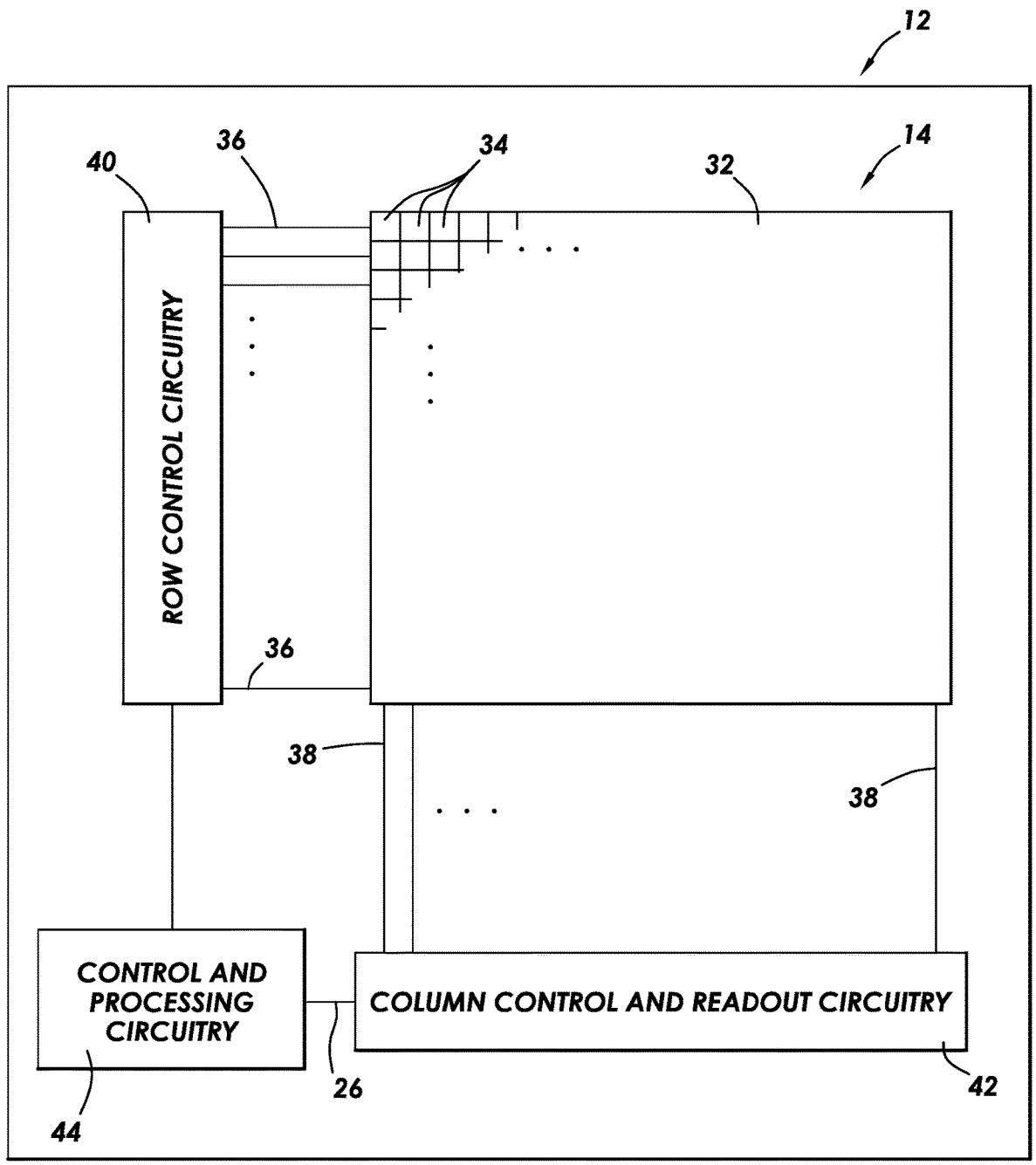
FIG. 2 is a diagram of an illustrative pixel array and associated readout circuitry for reading out image signals in an image sensor in accordance with an embodiment.

An example of an arrangement for camera module 12 of FIG. 1A is shown in FIG. 2. As shown in FIG. 2, camera module 12 includes image sensor package 14 and control and processing circuitry 44. Control and processing circuitry 44 may correspond to image processing and data formatting circuitry 16 in FIG. 1A. Image sensor package 14 may include a pixel array such as array 32 of pixels 34 (e.g., formed on one or more image sensor chips in the image sensor package) and may also include control circuitry 40 and 42. Control and processing circuitry 44 may be coupled to row control circuitry 40 and may be coupled to column control and readout circuitry 42 via data path 26. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from pixels 34 (sometimes referred to herein as image sensor pixels, imaging pixels, or image pixels 34) and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 34.

If desired, array 32 may be part of a stacked-die arrangement in which pixels 34 of array 32 are split between two or more stacked substrates. In such an arrangement, each of the pixels 34 in the array 32 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, a conductive via, etc.) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source follower transistor and a row select transistor, or any other desired node of the pixel circuit.

In general, array 32, row control circuitry 40, column control and readout circuitry 42, and control and processing circuitry 44 may be split between two or more stacked substrates. In one example, array 32 may be formed in a first substrate and row control circuitry 40, column control and readout circuitry 42, and control and processing circuitry 44 may be formed in a second substrate. In another example, array 32 may be split between first and second substrates (using one of the pixel splitting schemes described above) and row control circuitry 40, column control and readout circuitry 42, and control and processing circuitry 44 may be formed in a third substrate.

Imaging systems described herein may include selectively transmissive electronic shutters. The opacity of the electronic shutter may be tuned during operation of the imaging system. The electronic shutter may be used to increase the dynamic range of the imaging system.

Figure 3:
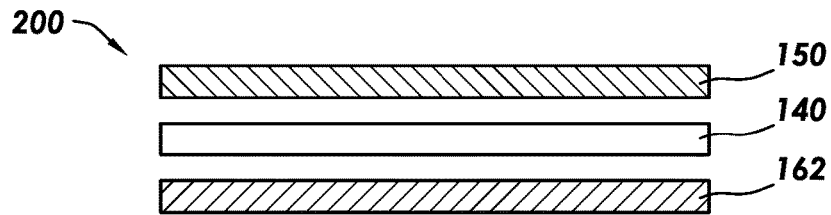
FIG. 3 is a cross-sectional side view of an illustrative electronic shutter in accordance with an embodiment.

FIG. 3 is a cross-sectional side view of an illustrative electronic shutter that may be incorporated into imaging system 10. As shown in FIG. 3, electronic shutter 200 includes a first linear polarizer 150, a tunable polarization rotator 140, and a second linear polarizer 162. The functionality of electronic shutter 200 is described in greater detail in connection with FIG. 4.

Figure 4:
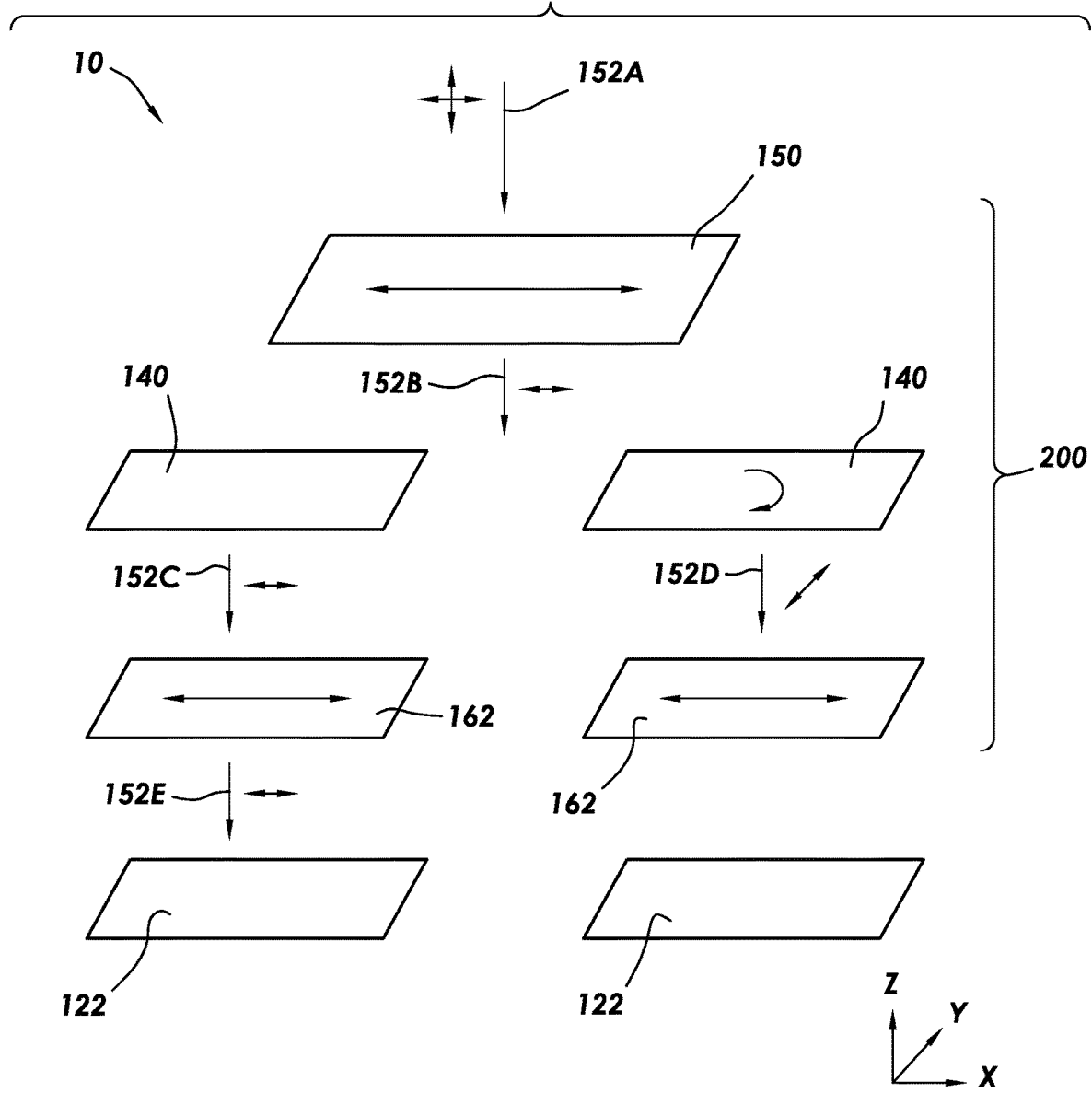
FIG. 4 is a diagram of an illustrative imaging system with an electronic shutter in accordance with an embodiment.

FIG. 4 is a schematic diagram showing the operation of an imaging system with an electronic shutter that includes a tunable polarization rotator. As shown in FIG. 4, incident light 152A may approach the imaging system with a mix of polarizations (e.g., 'unpolarized' light). The incident light 152A may pass through a linear polarizer 150 having a pass axis that is parallel to the X-axis of FIG. 4. Thus, the light 152B exiting the linear polarizer 150 has a uniform polarization (e.g., parallel to the X-axis). The uniformly polarized light is subsequently provided to a tunable polarization rotator 140.

In FIG. 4, the tunable polarization rotator selectively rotates the polarization of the light. The tunable polarization rotator may have a first state (on the left) in which light passes through the tunable polarization rotator unchanged and a second state (on the right) in which the polarization of light that passes through the tunable polarization rotator is rotated. On the left, the light 152C that passes through the tunable polarization rotator therefore has a polarization axis that is parallel to the X-axis. On the right, the light 152D that passes through the tunable polarization rotator therefore has a polarization that is parallel to the Y-axis (e.g., an orthogonal polarization as light 152B). The light from the tunable polarization rotator may then reach an additional linear polarizer 162. In the example of FIG. 4, linear polarizer 162 has a pass axis (e.g., an optical axis) that is parallel to the X-axis (e.g., parallel to the pass axis of linear polarizer 150). Therefore, light 152C (on the left) passes through linear polarizer 162. Light 152E from linear polarizer 162 then reaches image sensor die 122. In contrast, light 152D (on the right) is blocked by linear polarizer 162 and does not reach image sensor die 122.

In the example of FIG. 4, linear polarizer 162 has an optical axis that is parallel to the optical axis of linear polarizer 150. Therefore, light that is not rotated by tunable polarization rotator 140 passes through linear polarizer 162 and light that is rotated by tunable polarization rotator 140 is blocked by linear polarizer 162. This example is merely illustrative. If desired, the linear polarizer 162 may have an optical axis that is orthogonal to the optical axis of polarizer 150. In this type of arrangement, light that is rotated by tunable polarization rotator 140 passes through linear polarizer 162 and light that is not rotated by tunable polarization rotator is blocked by linear polarizer 162.

Ultimately, electronic shutter 200 is able to selectively control how much of the incident light (152A) is transmitted to the underlying image sensor die 122. In the example on the left in FIG. 4, most of the light 152B exiting the linear polarizer 150 is transmitted to image sensor die 122. The electronic shutter 200 therefore has a maximum transparency in this state. In the example on the right in FIG. 4, most of the light 152B exiting the linear polarizer 150 is blocked from reaching image sensor die 122. The electronic shutter 200 therefore has a minimum transparency in this state. The maximum ratio that the system can achieve between the maximum transparency and the minimum transparency states is called the maximum shutter efficiency.

By controlling the tunable polarization rotator 140, the transparency of the electronic shutter may be selected to be an intermediate magnitude between the maximum transparency and the minimum transparency. The imaging system may operate with the electronic shutter at any desired transparency ratio between 1 and the maximum shutter efficiency of the system.

Figure 5A:
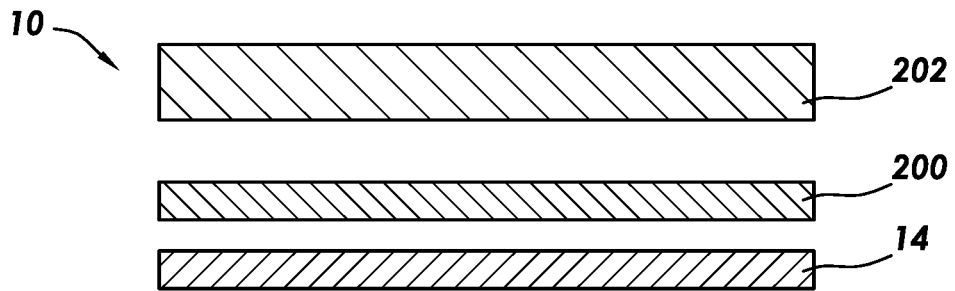
FIG. 5A is a cross-sectional side view of an imaging system with an electronic shutter interposed between an image sensor and a lens module in accordance with an embodiment.

Electronic shutter 200 may be incorporated into the imaging system at any desired location. As shown in FIG. 5A, electronic shutter 200 may be incorporated into imaging system 10 between image sensor 14 and lens module 202. Lens module 202 may include one or more lenses that focus light onto image sensor 14. The one or more lenses in lens module 202 may be controlled by one or more corresponding actuators that physically move the lens(es).

Figure 5B:
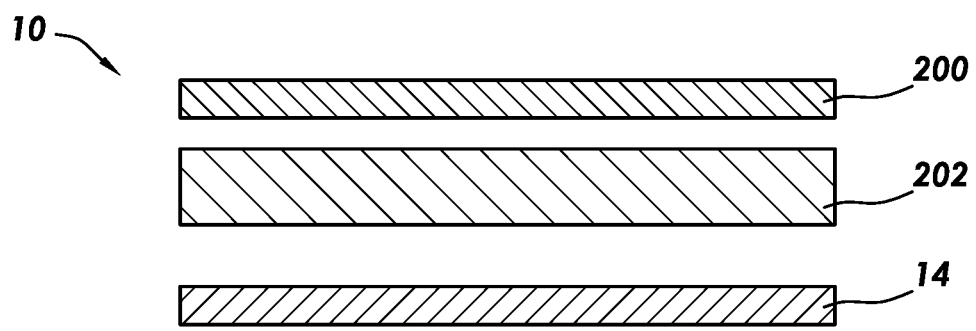
FIG. 5B is a cross-sectional side view of an imaging system with a lens module interposed between an image sensor and an electronic shutter in accordance with an embodiment.

The example in FIG. 5A of electronic shutter 200 being positioned between image sensor 14 and lens module 202 is merely illustrative. In another possible arrangement, shown in FIG. 5B, the lens module 202 is interposed between image sensor 14 and electronic shutter 200.

Figure 5C:
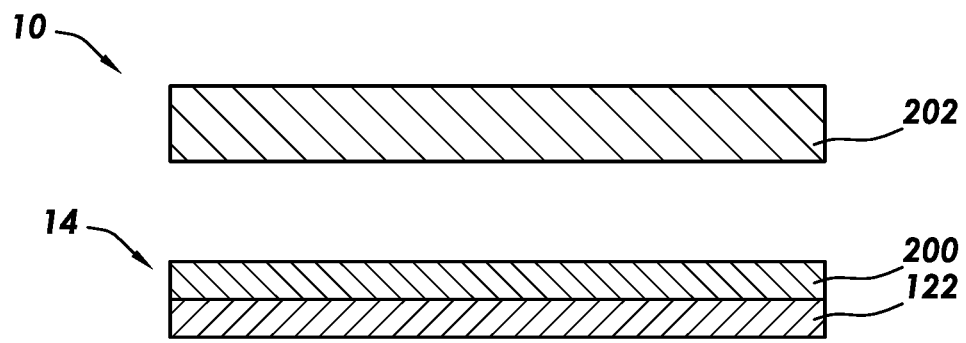
FIG. 5C is a cross-sectional side view of an imaging system with an electronic shutter that forms a front cover for an image sensor package in accordance with an embodiment.

The electronic shutter 200 may be separated from image sensor 14 by an air gap (as shown in the example of FIG. 5A). In other words, the image sensor 14 may have a transparent package cover that is separated from electronic shutter 200 by an air gap. Alternatively, as shown in FIG. 5C, the electronic shutter may be integrated directly into an image sensor package. For example, the electronic shutter may serve as package cover for the image sensor package. Integrating electronic shutters and image sensor packages in this way is beneficial as it reduces system size and weight and also helps with mitigation of optical losses and image artifacts due to reflections.

Imaging system 10 may include a physical shutter in addition to electronic shutter 200. Electronic shutter 200 may be interposed between image sensor 14 and the physical shutter, as one example.

An air gap or a material with preferred optical properties may be included between the image sensor die and the electronic shutter. Alternatively, there may be no gap between the image sensor die and the electronic shutter.

The electronic shutter may be controlled at a global level, at a sub-array level, or at a pixel level. When controlled at the global level, the entire electronic shutter may be controlled individually (e.g., the entire electronic shutter has the same state). In other words, the entire footprint of the electronic shutter is controlled in unison such that the entire footprint has a uniform transparency. The entire image sensor therefore receives light having the same amount of attenuation (or lack thereof) from the electronic shutter. When controlled at the sub-array level, the electronic shutter may be divided into sections that are smaller than the entire image sensor. Each section of the electronic shutter may be controlled individually (e.g., the sections of the electronic shutter may have different states). Control at the pixel level is a specific case (e.g., a subset) of control at the sub-array level. When controlled at the pixel level, the electronic shutter may be divided into sections that each correspond to an individual image sensor pixel. Each section of the electronic shutter may be controlled individually to provide the corresponding pixel with a desired attenuation. As yet another possible example, the entire electronic shutter maybe controlled at a global level. However, one or both polarizers in the system (e.g., polarizers 150 and 162 in FIG. 4) may be divided into sections that transmit light with different polarization types.

Figure 6:
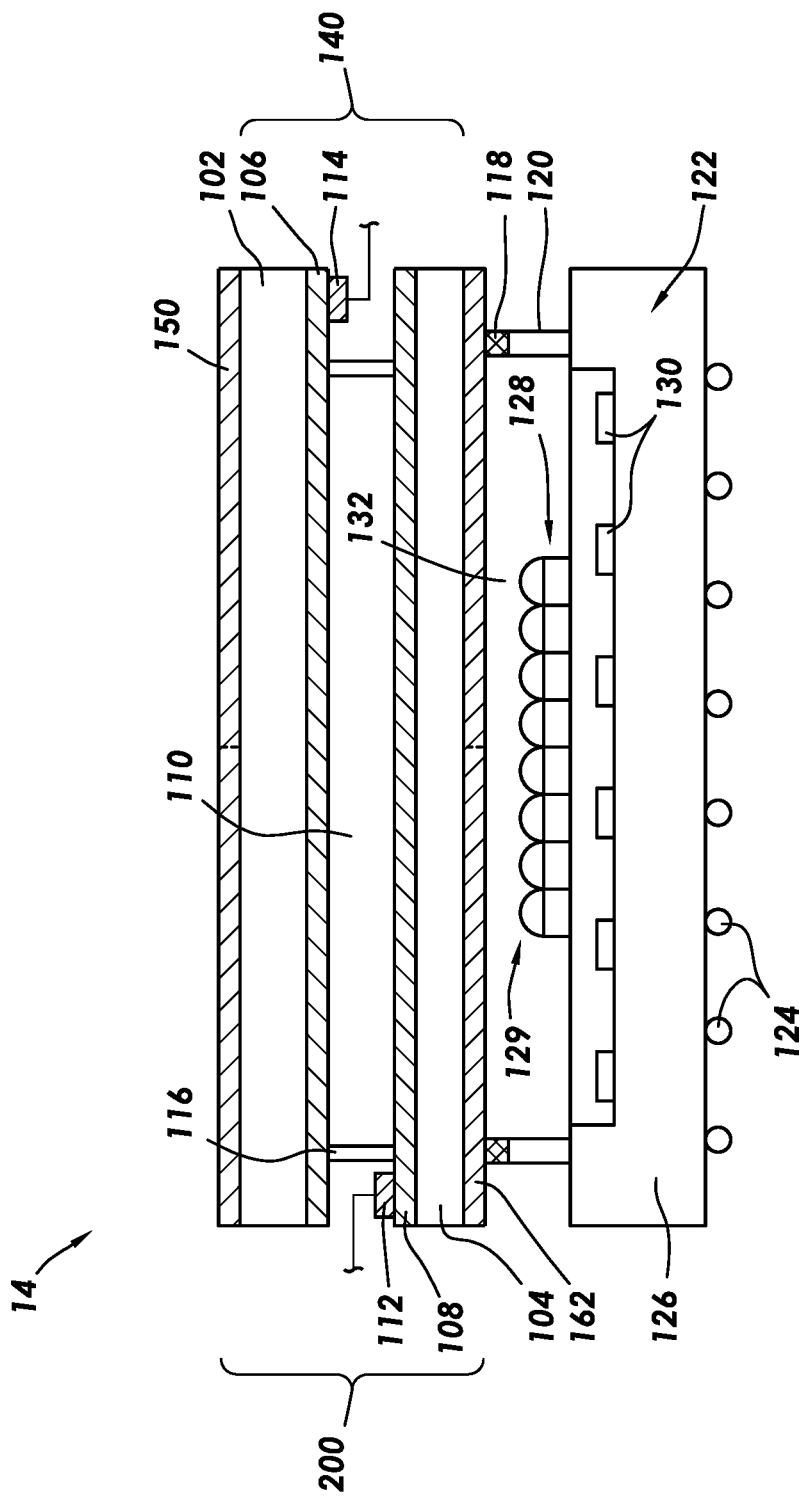
FIG. 6 is a cross-sectional side view of an illustrative image sensor package with an electronic shutter that forms a package cover, that is controlled globally, and that is separated from an image sensor die by an air gap in accordance with an embodiment.

FIG. 6 shows an illustrative integrated device 14 (sometimes referred to as an image sensor package 14 or package 14) with an image sensor and an electronic shutter. Image sensor package 14 includes image sensor chip 122 that may be covered by color filter array (CFA) 128 and microlenses 129 (sometimes collectively referred to as a CFA stack). Each color filter element 128 may cover one pixel (or more than one pixel) of the image sensor chip 122. A respective microlens 129 may cover each color filter element.

Image sensor 122 has bond pads 130. The bond pads 130 may be electrically connected to solder balls 124 (e.g., through vias in substrate 126 as one example). Substrate 126 may be coupled to a dam layer 120. Substrate 126 may sometimes be referred to as a package base. Substrate 126 may be formed from one or more dielectric layers (as one example). Dam layer 120 may be formed from any desired material and may have any desired dimensions. Dams 120 may, for example, be a photodefinable adhesive such as a dry film adhesive that can be applied and patterned using photolithographic techniques. Additional adhesive 118 may optionally be interposed between dam layer 120 and linear polarizer 162. In another example, dam layer 120 may be directly attached to linear polarizer 162 without intervening adhesive.

Tunable electronic shutter 140 (sometimes referred to as tunable polarization rotator 140, tunable polarization cover glass 140, tunable polarization filter 140, tunable polarization device 140, etc.) is formed over linear polarizer 162. Tunable electronic shutter 140 includes a layer of liquid crystal material 110 that is interposed between transparent substrates 102 and 104 and transparent conductive coatings 106 and 108 that serve as electrodes (and are therefore sometimes referred to as electrodes 106 and 108). Transparent substrates 102 and 104 may be formed from glass or another desired material. Linear polarizer 150 may be formed over transparent substrate 102. Spacer 116 may be used to enclose the liquid crystal material 110. A first electrode layer 106 may be interposed between liquid crystal layer 110 and glass substrate 102. A second electrode layer 108 may be interposed between liquid crystal layer 110 and glass substrate 104. The liquid crystal layer 110 serves as the switchable layer of tunable electronic shutter 140. The example of liquid crystal material being used to form the switchable layer of the tunable electronic shutter is also merely illustrative. In general, any material with a controllable optical property (e.g., in response to an electric field) may be used to selectively modify light in the tunable electronic shutter.

Electrode layer 106 may be electrically connected to terminal 114 (sometimes referred to as bias voltage supply terminal 114, voltage supply terminal 114, etc.). Electrode layer 108 may be electrically connected to terminal 112 (sometimes referred to as bias voltage supply terminal 112, voltage supply terminal 112, etc.).

Terminals 112 and 114 may be controlled to apply a desired electric field (bias voltage) across liquid crystal layer 110. At a first bias voltage, the liquid crystal layer may not rotate the polarization of incident light. At a second bias voltage, the liquid crystal layer may rotate the polarization of incident light (e.g., by ninety degrees). Intermediate bias voltages may also be used to rotate the incident light polarization by intermediate amounts. Selectively rotating the polarization of the incident light, in combination with linear polarizers 150 and 162, allows for electronic shutter 200 to have an adjustable transparency, thus selectively attenuating light provided to image sensor die 122.

Integrating electronic shutter 140 as part of package 14 reduces the size and weight of the imaging system and also helps with mitigation of optical losses and image artifacts due to reflections.

In FIG. 6, electronic shutter 200 is separated from image sensor 122, color filter array 128, and microlenses 129 by air-filled gap 132. This example is merely illustrative and the air-filled gap may be filled with other material if desired.

One or both of linear polarizers may optionally be divided into different sections, as indicated by the dashed lines in the middle of polarizers 150 and 162 of FIG. 6. The different sections of the linear polarizers may pass light of different polarization states. For example, a portion of polarizer 150 to the left of the dashed line may transmit light of a first polarization state and block light of a second polarization state. A portion of polarizer 150 to the right of the dashed line may transmit light of the second polarization state and block light of the first polarization state. Similarly, a portion of polarizer 162 to the left of the dashed line may transmit light of the first polarization state and block light of the second polarization state. A portion of polarizer 162 to the right of the dashed line may transmit light of the second polarization state and block light of the first polarization state. These examples are merely illustrative. In general, each polarizer may be divided into any desired number of sections that respectively transmit light of any desired polarization state.

In the example of FIG. 6, the electronic shutter 200 is controlled globally. Electrodes 106 and 108 cover the entire image sensor chip 122. The electrodes may be controlled such that the entire liquid crystal layer is placed in a desired state and all of the light received by the image sensor chip is attenuated (or not attenuated) in the same manner by the electronic shutter.

Figure 7:
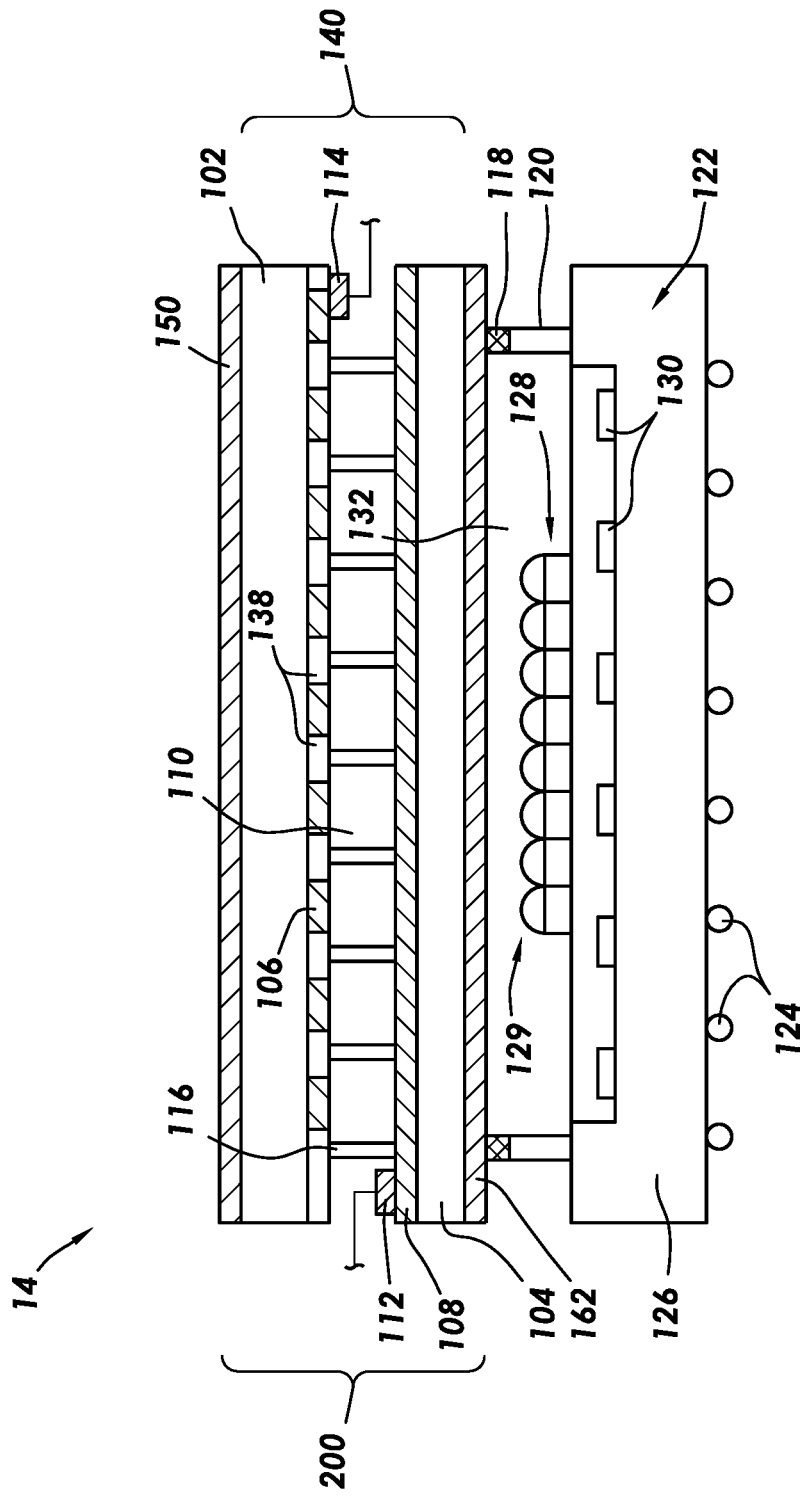
FIG. 7 is a cross-sectional side view of an illustrative image sensor package with an electronic shutter that forms a package cover, that is divided into sub-array sized segments, and that is separated from an image sensor die by an air gap in accordance with an embodiment.

This example is merely illustrative. If desired, the electronic shutter 200 may be controlled at a sub-array level or at a per-pixel level. FIG. 7 shows an image sensor package 14 of this type. The package of FIG. 7 is similar to the package of FIG. 6 and the components already described in connection with FIG. 6 will not be described again in connection with FIG. 7.

In FIG. 7, instead of a single continuous conductive structure as in FIG. 6, electrode 106 is divided into electrically isolated sections by insulator 138. The insulator 138 may be formed from any desired material. Similarly, additional spacers 116 may be incorporated to divide liquid crystal layer 110 into isolated sections. Insulators 138 and spacers 116 may be overlapping (e.g., in a grid pattern). Each section of liquid crystal layer 110 (defined by spacers 116) may have a corresponding section of electrode 106 (defined by insulators 138). Each section of the electrode is configured to control its corresponding section of liquid crystal layer 110.

Each individually controllable section of electrode 106 (and liquid crystal layer 110) may overlap less than all of the pixels of image sensor 122 (in a sub-array control scheme) and/or may overlap exactly one pixel of image sensor 122 (in a per-pixel control scheme). Each section of electrode 106 may have a corresponding terminal 114 for controlling the bias voltage applied to that electrode section and corresponding portion of the liquid crystal layer. More than one terminal 114 may be needed to exploit the benefits of a divided electrode 106. Each individually controllable section of electrode 106 (and liquid crystal layer 110) may also be shifted or offset from respective pixels of the image sensor such that a global lens system with a specific chief ray angle causes light to pass at an angle through specific sectors of the tunable polarizer into designated pixels of the image sensor. Microlenses, color filters and any other features between the electronic shutter and the image sensor photodiodes may also likewise be shifted radially in order to maximize the angular acceptance of an image focused through the camera system.

The example of the electrode 106 between liquid crystal material 110 and transparent substrate 102 being divided into electrically isolated sections while electrode 108 remains undivided is merely illustrated. If desired, the inverse arrangement (of a divided electrode 108 and undivided electrode 106) may be used.

In FIG. 7, electronic shutter 200 is again separated from image sensor 122, color filter array 128, and microlenses 129 by air-filled gap 132. This example is merely illustrative and the air-filled gap may be filled with other material if desired.

FIG. 8 shows an example of an image sensor package without an air-filled gap between image sensor chip 122 and the electronic shutter 200. The package of FIG. 6 is similar to the package of FIG. 6 and the components already described in connection with FIG. 6 will not be described again in connection with FIG. 8. Again, in FIG. 8, there may be shifts or offsets in the radial locations of the sectors or pixel components that optimize the collection of light from the imaged scene onto the photodiodes of each pixel. These parameters are optimized based on the chief ray angle of the focusing lens and on the distances of each component in the z-axis of the system.

In FIG. 8, a package 14 is shown that has no air gap between microlenses 129 and color filter array 128 and electronic shutter 200. Transparent adhesive layer 136 may be interposed between electronic shutter 200 and microlenses 129 and color filter array 128 (sometimes collectively referred to as a color filter stack). In some embodiments, transparent adhesive layer 136 may directly contact both linear polarizer 162 of the electronic shutter and the microlenses 129 formed over image sensor 122. However, an additional low-index layer 134 may optionally be included over the color filter stack. As shown in FIG. 8, low-index layer 134 may cover the color filter stack and image sensor chip 122. The transparent adhesive 136 is accordingly in direct contact with linear polarizer 162 and the low-index layer 134. Including low-index layer 134 in package 14 may increase an index-of-refraction difference between microlenses and the surrounding material to allow the microlenses to better focus light. Low-index layer 134 may have a lower index-of-refraction than microlenses 129 and/or adhesive layer 136. The index-of-refraction of low-index layer 134 may be less than 1.5, less than 1.4, less than 1.3, less than 1.2, less than 1.1, etc.

As shown in FIG. 8, the electronic shutter 200 may be controlled globally. Alternatively, the electronic shutter 200 of FIG. 8 may be controlled at the sub-array and/or per-pixel level similar to as in FIG. 7.

In the examples of FIGS. 6-8, linear polarizer 150 is formed directly on the transparent substrate 102 of the image sensor package. This may improve alignment of the linear polarizer relative to the tunable polarization rotator compared to an arrangement where linear polarizer 150 is formed external to the image sensor package. However, depending upon the particular design of the imaging system, linear polarizer 150 may optionally be formed externally to the image sensor package (e.g., the linear polarizer may not be directly attached to the image sensor package and may instead be incorporated into lens module 202 above the image sensor package).

In FIGS. 6-8, substrate 126, dam 120, adhesive 118, image sensor die 122, and electronic shutter 200 may collectively be referred to as an integrated image sensor with an electronic shutter or an image sensor package. Electronic shutter 200 forms the cover (sometimes referred to as a wall) for the image sensor package. Substrate 126 may be referred to as forming a base or wall for the image sensor package. Dam 120 and adhesive 118 may be referred to as forming walls for the image sensor package. Instead of simply a transparent substrate forming the cover of the package, the electronic shutter 200 forms the cover of the package. This example, however, is merely illustrative. In an alternate arrangement, the electronic shutter may be incorporated into the CFA stack.

FIG. 9 is a cross-sectional side view of an illustrative image sensor package with an electronic shutter formed underneath microlenses for the pixel array. As shown in FIG. 9, similar to the previous examples, image sensor package 14 includes image sensor chip 122 that may be covered by color filter array (CFA) 128 and microlenses 129 (sometimes collectively referred to as a CFA stack). Each color filter element 128 may cover one pixel (or more than one pixel) of the image sensor chip 122. A respective microlens 129 may cover each color filter element.

Instead of electronic shutter 200 forming the front cover of the image sensor package (as in FIGS. 6-8), a transparent substrate 104 (e.g., formed from transparent plastic, glass, etc.) forms the front cover of the package in FIG. 9. The electronic shutter 200 may be interposed between color filter array 128 and microlenses 129. This example is merely illustrative, and the electronic shutter may instead be formed above the microlenses or below the color filter array (between the color filter array and the image sensor die). The electronic shutter of FIG. 9 may be controlled globally or at a sub-array and/or per-pixel level. In one example, the electronic shutter may have an array of portions, with each individually controllable portion corresponding to a respective pixel in the underlying image sensor die.

In the examples of FIGS. 6-9, the passive and active components of the image sensor package have uniform optical properties. In other words, the passive components such as linear polarizers 150 and 162 have the same optical axis direction across the entire area of the polarizer. The active component (e.g., liquid crystal layer) may also have the same optical properties throughout (even when the liquid crystal layer may be controlled at a sub-array and/or per-pixel level). However, this need not be the case. In some arrangements, the optical properties of the passive and/or active components may vary across the image sensor. For example, linear polarizers 150 and/or 162 may have different pass axis orientations at different locations within the polarizer.

If care is not taken, imaging system 10 and corresponding image sensor 14 may have a lower than desired dynamic range. The electronic shutter described herein may be used with multiple exposures to increase the dynamic range of the imaging system. When only one type of exposure is used by the imaging system, there will be a tradeoff between high light level performance and low light level performance. For example, if a short integration time is used for the exposure, the imaging system may have improved high light level performance but poor low light level performance. If a long integration time is used, the imaging system may have improved low light level performance but poor high light level performance.

In some applications, there may be restrictions on the integration times for image sensor 14. As one example, the integration time may need to have a minimum duration to avoid artifacts caused by flickering light in the scene. Examples of flickering light include light-emitting diode (LED) traffic signs (which can flicker several ten times per second) and LED brake lights or headlights of modern cars. The flickering lights may rapidly change between on periods (in which light is emitted) and off periods (in which light is not emitted). The LED appears continuously on to the human eye. However, without performing flicker mitigation operations, one or more pixels in image sensor 14 may have an exposure that does not align with any of the on periods of the flickering light in the scene. This is especially true for bright scenery when integration times are short. Therefore, the flickering light may cause various artifacts in images captured by imaging system 10 . The flickering light may cause flickering artifacts where an LED with a constant duty cycle appears on in one frame and off in a consecutive frame. The flickering light may also cause color artifacts. Flickering artifacts may misguide machine vision systems. For example, in automotive applications the flickering artifacts may be interpreted as a turn signal or signals from an emergency vehicle.

To mitigate artifacts caused by LED flickering in a scene, the integration time for the image sensor may be selected to be sufficiently long to capture the on periods of the flickering light. For example, consider a light-emitting diode in the scene that operates (i.e., has on periods) at a frequency of 90 Hz. In this example, the time between each on period of the light-emitting diode is 11.1 milliseconds. To ensure that the flickering light is captured by the image sensor, the integration time may therefore be selected to have a duration of at least 11.1 milliseconds. In bright scenes (or bright portions of a scene), however, this integration time may be too long and results in saturation of the image sensor. Usually, to capture a frame with low exposure that allows the details of very bright regions in the scene, the integration time is shortened. However, shortening the integration time below 11.1 milliseconds may result in artifacts from the flickering light.

The electronic shutter may be used to increase dynamic range without risking artifacts from flickering light in the scene. Consider the aforementioned example of a bright scene that is limited to an integration time of at least 11.1 milliseconds. To capture a frame with low exposure, the electronic shutter may be placed in a low-transparency mode where much of the incident light is attenuated and a small amount of light passes through to the image sensor. Attenuating the light in this manner prevents saturation of the image sensor even at long integration times that meet the requirements to avoid flicker artifacts.

The electronic shutter may be placed in a low-transparency mode to improve performance in high light level conditions and may be placed in a high-transparency mode to improve performance in low light level conditions. To increase the dynamic range of the imaging system and ensure good performance in both bright and dim portions of a single scene, the imaging system may perform multiple exposures while the electronic shutter is in different states and then combine the captures to produce a single high dynamic range image.

Figure 10:
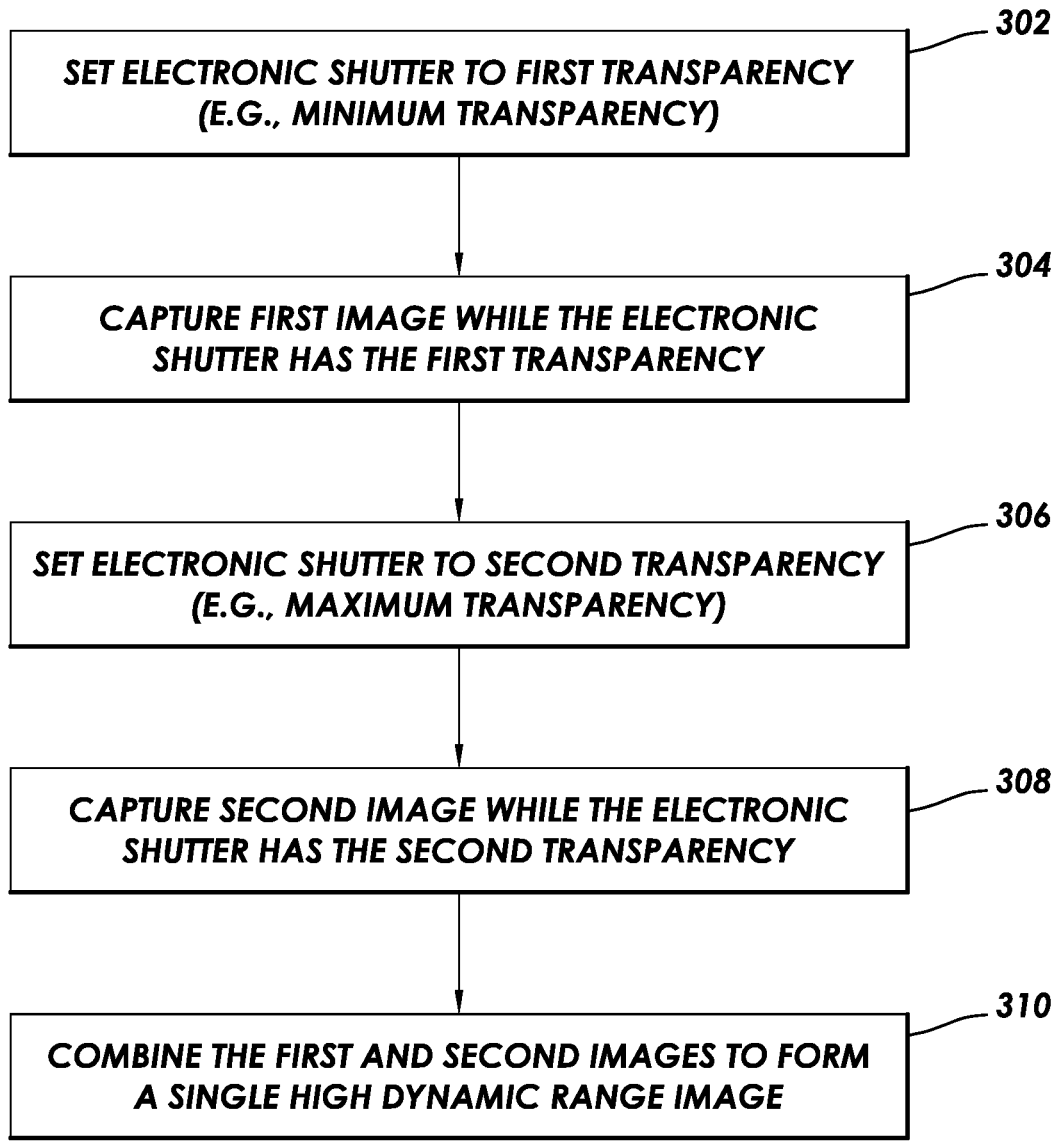
FIG. 10 is a flowchart of illustrative method steps for operating an imaging system with an electronic shutter in accordance with an embodiment.

The aforementioned example of having the integration time be greater than 11.1 milliseconds is merely illustrative. In general, the integration time for a given image capture may be greater than 1 millisecond, greater than 5 milliseconds, greater than 10 milliseconds, greater than 15 milliseconds, greater than 20 milliseconds, greater than 100 milliseconds, less than 15 milliseconds, between 5 and 20 milliseconds, etc. FIG. 10 is a flowchart showing illustrative steps for operating an imaging system while the electronic shutter is placed in different transparency states. First, at step 302, control circuitry within the imaging system (e.g., control circuitry 44 in camera module 12 or other control circuitry in the system) may set the electronic shutter to a first transparency state. For example, the electronic shutter may be set to a low or minimum transparency where most (but not all) of the incident light is blocked from reaching the image sensor. This electronic shutter setting may optimize high light level performance.

At step 304, based on control signals from control circuitry 44, image sensor 14 may capture a first image while the electronic shutter is in the first transparency state. The image sensor may operate with a corresponding first integration time while capturing the first image at step 304. The first integration time may be sufficiently long to capture flickering lights (e.g., greater than 11.1 milliseconds in the aforementioned example of capturing an image of a 90 Hz LED).

Next, at step 306, control circuitry within the imaging system (e.g., control circuitry 44 in camera module 12 or other control circuitry in the system) may set the electronic shutter to a second transparency state. For example, the electronic shutter may be set to a high or maximum transparency where more of the incident light (than in step 302) passes through the electronic shutter to reach the image sensor. This electronic shutter setting may optimize low light level performance.

At step 308, based on control signals from control circuitry 44, image sensor 14 may capture a second image while the electronic shutter is in the second transparency state. The image sensor may operate with a corresponding second integration time while capturing the second image at step 308. The second integration time may also be sufficiently long to capture flickering lights (e.g., greater than 11.1 milliseconds in the aforementioned example of capturing an image of a 90 Hz LED). In one illustrative example, the first and second integration times from steps 304 and 308 may have the same magnitude.

Finally, at step 310, the first and second images may be combined to form a single high dynamic range (HDR) image. Because the first image is generated while the electronic shutter has a low transparency, the first image may be optimal for high light conditions due to the low saturation point associated with the low transparency of the electronic shutter. Because the second image is generated while the electronic shutter has a high transparency, the second image may be optimal for low light conditions due to the high sensitivity associated with the high transparency of the electronic shutter. Imaging processing circuitry 16 (sometimes referred to as control circuitry) may combine the images by selecting the most useful data from each image. For example, a first, dimly lit portion of the scene may appear totally dark in the first image but may have high contrast in the second image. The data from the second image is therefore used for the first portion of the scene. A second, brightly lit portion of the scene may appear saturated (washed out) in the second image but may have high contrast in the first image. The data from the first image is therefore used for the second portion of the scene. The resulting HDR image may have high contrast over a wide range of light conditions and may have no flicker artifacts.

The example described in FIG. 10 of the electronic shutter being placed in the minimum (low) transparency state before the maximum (high) transparency state is merely illustrative. In general, the electronic shutter may be placed in desired transparency states in any desired order. The electronic shutter may also have any desired transparency in each one of the first and second transparency states. In other words, intermediated transparency magnitudes may be used in addition to the maximum transparency and the minimum transparency.

Additionally, the example of capturing two images in synchronization with two corresponding electronic shutter transparencies is merely illustrative. In general, any desired number of images may be captured during the operations of imaging system 10. For each captured image, the electronic shutter transparency and/or integration time may be different than the other captured images. Regardless of how many images are captured (e.g., two, three, four, more than four, etc.), the images may all be combined to form a single high dynamic range image at step 310.

As a first example, two images may be captured and combined to form the single high dynamic range image. The two images may be captured with the same integration time but different electronic shutter transparencies.

As a second example, two images may be captured and combined to form the single high dynamic range image. The first image may be captured with a first electronic shutter transparency and a first integration time whereas the second image may be captured with a second electronic shutter transparency and a second integration time. The first and second electronic shutter transparencies may be different and the first and second integration times may also be different. Specifically, the first electronic shutter transparency may be higher than the second electronic shutter transparency and the first integration time may be longer than the second integration time.

As a third example, three images may be captured and combined to form the single high dynamic range image. The three images may be captured with the same integration time but different electronic shutter transparencies. The first image may have a first corresponding electronic shutter transparency (e.g., the minimum transparency or another desired transparency), the second image may have a second corresponding electronic shutter transparency (e.g., an intermediate transparency) that is greater than the first electronic shutter transparency, and the third image may have a third corresponding electronic shutter transparency (e.g., the maximum transparency or another desired transparency) that is greater than the second electronic shutter transparency.

As a fourth example, four images may be captured and combined to form the single high dynamic range image. The first image may be captured with a first electronic shutter transparency and a first integration time, the second image may be captured with a second electronic shutter transparency and a second integration time, the third image may be captured with a third electronic shutter transparency and a third integration time, and the fourth image may be captured with a fourth electronic shutter transparency and a fourth integration time. The first and second electronic shutter transparencies may be the same and the third and fourth electronic shutter transparencies may be the same. The first and third integration times may be the same and the second and fourth integration times may be the same. Specifically, the first and second electronic shutter transparencies may be higher than the third and fourth electronic shutter transparencies and the first and third integration times may be longer than the second and fourth integration times.

To summarize, any number of images may be captured using any combination of electronic shutter transparencies and integration times to form the single high dynamic range image in step 310.

The method of FIG. 10 may be used in an image sensor that operates with a global shutter scheme (where every image pixel in the image sensor simultaneously captures an image) or a rolling shutter scheme (where each row of image pixels sequentially captures an image).

FIG. 10 describes the entire electronic shutter being controlled in unison (e.g., controlled globally as in FIG. 6). This example is merely illustrative. The electronic shutter may have sub-array (and/or per-pixel) control as previously discussed. In this case, different portions of the electronic shutter may have different transparencies for a given integration time.

For example, a first image may be captured while a first half of the electronic shutter has a first transparency and a second half of the electronic shutter has a second transparency. A second image may then be captured while the first half of the electronic shutter has the second transparency and the second half of the electronic shutter has the first transparency. The first and second images may be combined to form a single high dynamic range image.

As another example, a first image may be captured while a first portion of the shutter that corresponds to a first, brightly lit portion of the scene has a first transparency while a second portion of the shutter that corresponds to a second, dimly lit portion of the scene has a second transparency that is higher than the first transparency. The portions of the electronic shutter may be placed in given transparency states based on the brightness of one or more previous images. The first image may be used to form the high dynamic range image (without using any additional image captures). Alternatively, one or more additional images may be captured with different shutter transparencies and/or integration times and all of the images may be combined to form a single high dynamic range image.

The image sensor in the imaging system may have, for example, one or more clear or broadband image pixels (e.g., covered by a clear color filter element instead of a red, blue, or green color filter element that transmit narrowband light in the visible band) in addition to one or more colored image pixels (e.g., covered by a red, blue, or green color filter element). The clear image pixels may saturate more quickly than the colored image pixels when exposed to white light. The techniques described herein to increase dynamic range may therefore be useful in imaging systems with clear image pixels.

The example of using the electronic shutter to increase dynamic range in the imaging system is merely illustrative. There are many possible applications for imaging systems with electronic shutters. As another example, the electronic shutter may improve performance of a time-of-flight imaging system. In a time-of-flight imaging system, a light source such as a laser may emit light that reflects off objects in the scene and is sensed by an image sensor in the imaging system. The length of time between the emission of the light and the detection of the light may be used to determine the distance between the reflective object and the image sensor. In a time-of-flight imaging system, the electronic shutter may be placed in a low transparency mode to prevent saturation of the sensor in bright lighting conditions. The electronic shutter may optionally have wavelength-dependent transparency (e.g., different amounts of visible light and infrared light may be transmitted by the electronic shutter).

The foregoing is merely illustrative and various modifications can be made by those skilled in the art. The foregoing embodiments may be implemented individually or in any combination.

What is claimed is:

1. An imaging system comprising:
   an electronic shutter operable in a first state with a first transparency and a second state with a second transparency that is lower than the first transparency;
   an image sensor having an array of imaging pixels, wherein the image sensor is configured to capture a first image while the electronic shutter is in the first state and capture a second image while the electronic shutter is in the second state, wherein the image sensor if formed in an image sensor package, and wherein the electronic shutter is a package cover for the image sensor package; and
   image processing circuitry configured to generate a single high dynamic range image using the first and second images, wherein generating the single high dynamic range image using the first and second images comprises combining the first and second images using at least some of the data from each one of the first and second images.

2. The imaging system defined in claim 1, further comprising:
   a lens module, wherein the electronic shutter is interposed between the lens module and the image sensor.

3. The imaging system defined in claim 2, wherein incident light passes through the lens module and the electronic shutter in that order to reach the image sensor.

4. The imaging system defined in claim 1, wherein the electronic shutter comprises a layer of liquid crystal material.

5. The imaging system defined in claim 4, wherein the electronic shutter comprises first and second electrodes and wherein the layer of liquid crystal material is interposed between the first and second electrodes.

6. The imaging system defined in claim 5, wherein the electronic shutter comprises first and second transparent substrates, wherein the first electrode is interposed between the layer of liquid crystal material and the first transparent substrate, wherein the second electrode is interposed between the layer of liquid crystal material and the second transparent substrate, wherein the electronic shutter comprises first and second linear polarizers, and wherein the layer of liquid crystal material is interposed between the first and second linear polarizers.

7. The imaging system defined in claim 1, wherein the electronic shutter comprises:
   a tunable polarization rotator;
   a first linear polarizer, wherein the tunable polarization rotator is interposed between the first linear polarizer and the image sensor; and
   a second linear polarizer interposed between the tunable polarization rotator and the image sensor.

8. The imaging system defined in claim 1, wherein there is an air gap between the image sensor and the electronic shutter.

9. The imaging system defined in claim 1, further comprising:
- a substrate that forms a base for the image sensor package, wherein the image sensor is interposed between the substrate and the electronic shutter; and
- a dam that forms a wall for the image sensor package, wherein the dam is attached between the substrate and the electronic shutter.

10. An imaging system comprising:
- an electronic shutter operable in a first state with a first transparency and a second state with a second transparency that is lower than the first transparency;
- a substrate;
- an image sensor that is positioned on the substrate and that has an array of imaging pixels, wherein the image sensor is configured to capture a first image while the electronic shutter is in the first state and capture a second image while the electronic shutter is in the second state;
- image processing circuitry configured to combine the first and second images using at least some of the data from each one of the first and second images to generate a single high dynamic range image; and
- transparent adhesive that attaches the substrate to the electronic shutter.

11. The imaging system defined in claim 10, wherein the image sensor comprises microlenses formed over the array of imaging pixels, the imaging system further comprising:
- a low-index layer formed between the microlenses and the transparent adhesive.

12. The imaging system defined in claim 11, wherein the transparent adhesive is in direct contact with both the low-index layer and the electronic shutter.

13. The imaging system defined in claim 1, wherein the electronic shutter has a uniform transparency across its footprint.

14. The imaging system defined in claim 1, wherein the electronic shutter has a plurality of independent segments that each cover a subset of the image sensor.

15. The imaging system defined in claim 1, wherein the image sensor is configured to capture the first image using an integration time having a first magnitude, wherein the image sensor is configured to capture the second image using a second integration time having the first magnitude, and wherein the first magnitude is greater than 10 milliseconds.

16. The imaging system defined in claim 1, wherein the image sensor is configured to capture the first image using an integration time having a first magnitude and wherein the image sensor is configured to capture the second image using a second integration time having a second magnitude that is different than the first magnitude.

17. The imaging system defined in claim 1, wherein the imaging system is an imaging system for a vehicle.

18. The imaging system defined in claim 10, wherein the transparent adhesive has a first portion that directly contacts the substrate and a second portion that is interposed between the image sensor and the electronic shutter.

19. A method of operating an imaging system having an electronic shutter, the method comprising:
- capturing a first image while the electronic shutter has a first transparency and using a first integration time having a given duration;
- capturing a second image while the electronic shutter has a second transparency that is different than the first transparency and using a second integration time having the given duration; and
- combining the first and second images to form a high dynamic range image.

20. The imaging system defined in claim 19, wherein the given duration is greater than 11.1 milliseconds, wherein the first transparency is a minimum transparency for the electronic shutter, and wherein the second transparency is a maximum transparency for the electronic shutter.

* * * * *